(12) United States Patent  
Smith et al.

(10) Patent No.: US 7,510,088 B2
(45) Date of Patent: Mar. 31, 2009

(54) LIQUID FILTER CARTRIDGE

(75) Inventors: James Michael Smith, West Haven, CT (US); Theodore B. Mulle, New Milford, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 11/485,684

(22) Filed: Jul. 13, 2006

(65) Prior Publication Data

US 2008/0011670 A1    Jan. 17, 2008

(51) Int. Cl.
*B01D 35/28* (2006.01)
*B01D 24/00* (2006.01)
*B01D 35/02* (2006.01)

(52) U.S. Cl. .................. 210/456; 210/435; 210/446; 210/473; 210/282; 210/289; 210/317

(58) Field of Classification Search .............. None
See application file for complete search history.

(56) References Cited

U.S. PATENT DOCUMENTS

| | | | | |
|---|---|---|---|---|
| 2,665,009 A * | 1/1954 | Harstick | ................. | 210/449 |
| 3,929,648 A * | 12/1975 | Cuthbert | ................. | 210/445 |
| 4,024,991 A * | 5/1977 | Tyson et al. | ................. | 210/474 |
| 4,113,627 A * | 9/1978 | Leason | ................. | 210/446 |
| 5,049,272 A * | 9/1991 | Nieweg | ................. | 210/266 |
| 5,173,192 A * | 12/1992 | Shalev | ................. | 210/767 |
| 5,240,620 A * | 8/1993 | Shalev | ................. | 210/767 |
| 5,688,397 A * | 11/1997 | Malmborg | ................. | 210/136 |
| 6,485,644 B2 * | 11/2002 | Bowler | ................. | 210/282 |

* cited by examiner

*Primary Examiner*—Krishnan S Menon
*Assistant Examiner*—Madeline Gonzalez
(74) *Attorney, Agent, or Firm*—Lawrence Cruz

(57) ABSTRACT

A water filter cartridge (10) has a two-piece housing (14, 18) internally configured with inlet and outlet openings (12, 16), a diffuser (42), and a plurality of diverter plates (56, 32) to optimize liquid flow and to regulate even flow through a charcoal filter medium (40) located inside of the housing.

1 Claim, 14 Drawing Sheets

LIQUID FILTER CARTRIDGE

CROSS-REFERENCE TO RELATED APPLICATIONS

None.

TECHNICAL FIELD

The present invention relates to liquid filters and, more particularly, to disposable liquid filters that are used for filtering liquids such as drinking water and that are suitable for household use.

BACKGROUND OF THE INVENTION

Existing appliances exist that are used for filtering liquids, such as drinking water, which utilized disposable filter cartridges. Typically, a filtering medium such as charcoal is used, sometimes in combination with a screen or another porous article. Certain devices are attachable to a faucet or other liquid port, while others are stand-alone containers. Filter cartridges such as those using a charcoal medium are usually hard plastic housings having one or more inlets and outlets for liquid such as water to enter and exit, wherein the charcoal is in the path of the liquid between the inlet and the outlet.

Typical filter cartridges require relatively large sized compared to the space occupied by the volume of water being filtered and stored by a stand-alone appliance. Such filters, especially when used with other components in the appliance such as a refrigeration system or heating system, contribute to an undesirably excessive use of space. Furthermore, in order to ensure even flow and uniform filtering, the shape of the filter housing and the positioning of inlet and outlet ports sometimes demands relatively large space requirements.

OBJECTS OF THE INVENTION

It is an object of the present invention to provide a disposable, space-efficient, optimally performing liquid filter. This object and other objects are achieved by the present invention.

BRIEF SUMMARY OF THE INVENTION

The present invention achieves the above-mentioned objects by utilizing a water filter cartridge having a two-piece housing internally configured with inlet and outlet openings, a diffuser, and a plurality of diverter plates to optimize liquid flow and to regulate even flow through a charcoal filter medium located inside of the housing.

DESCRIPTION OF THE PREFERRED EMBODIMENTS

The present invention is directed to a filter cartridge that is suitable for use with a counter-top, stand-alone water container and dispenser. The present invention is not, however, limited to water dispensers and can be used in a wide variety of liquid handling devices in which even filtering of flowing liquid is required.

Figure 1:
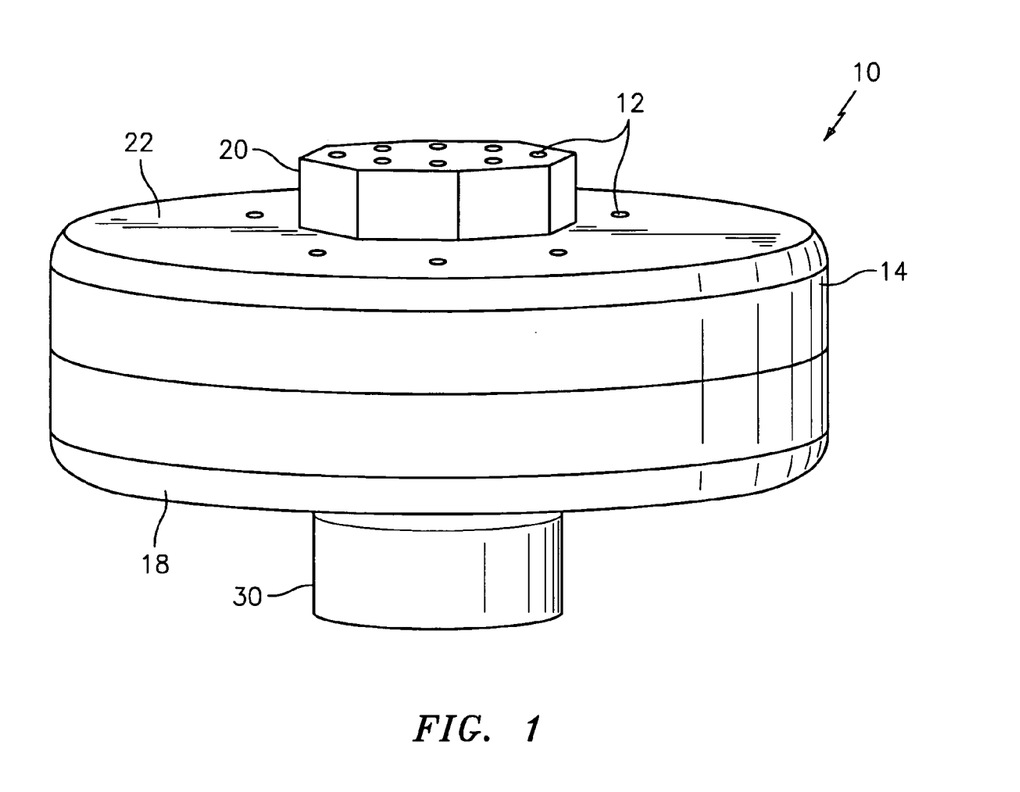
FIG. 1 is a side view of the preferred embodiment of the present invention.
Figure 2:
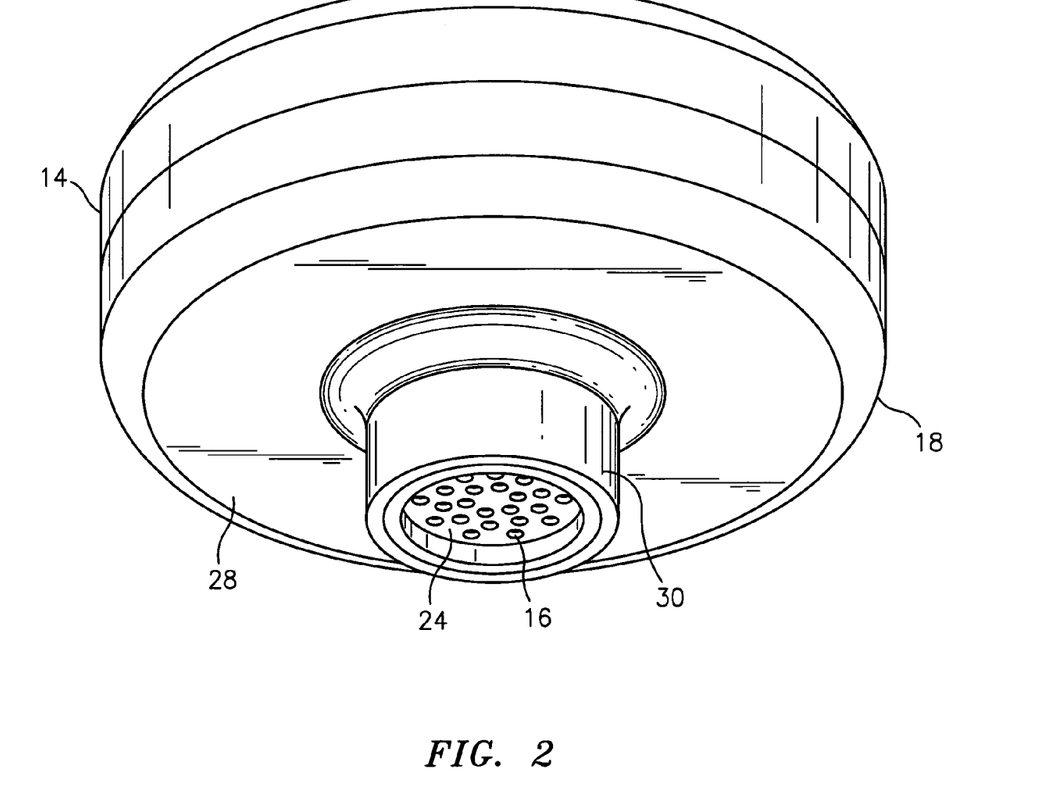
FIG. 2 is a bottom, perspective view of the preferred embodiment of the present invention.
Figure 3:
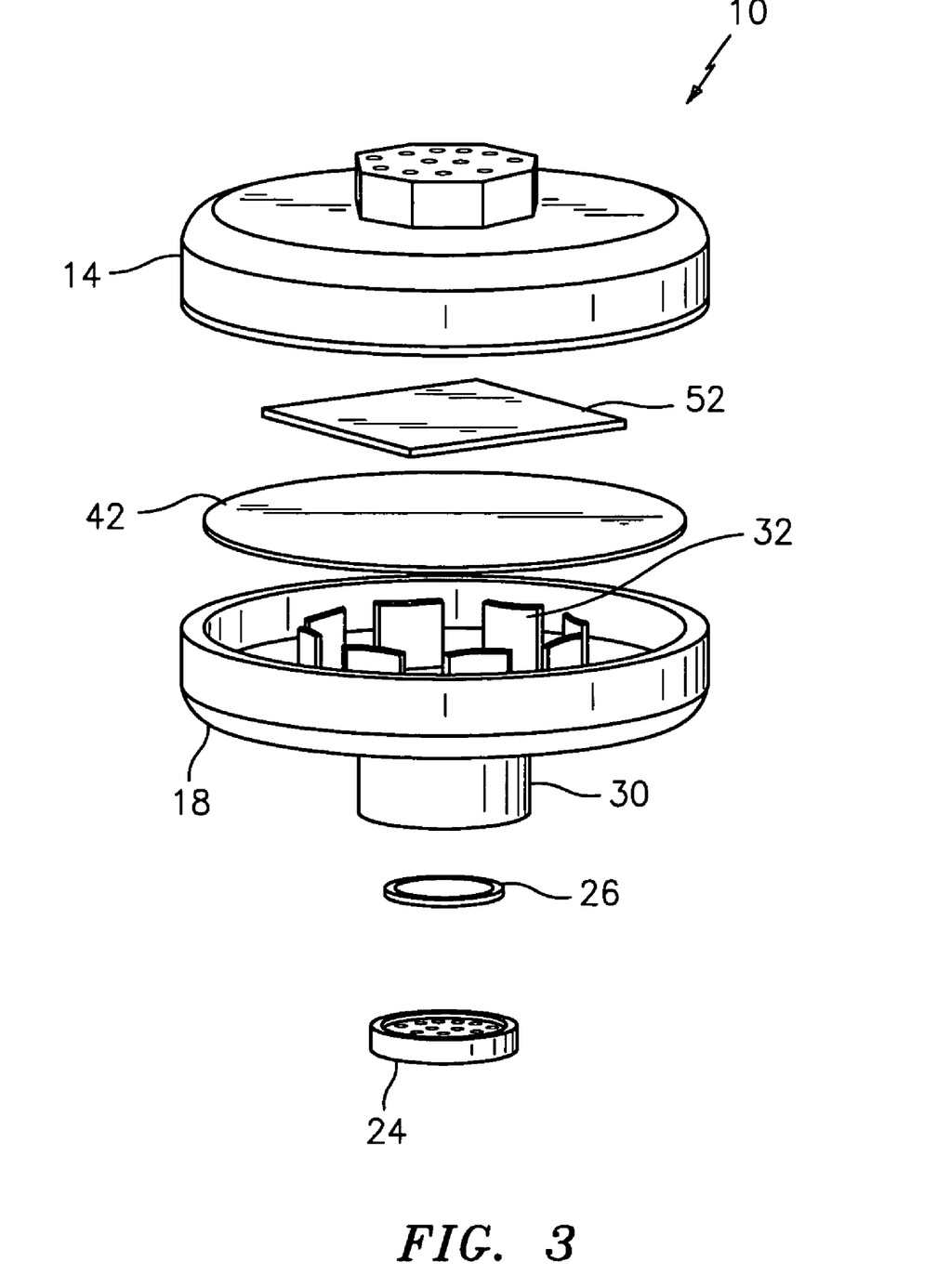
FIG. 3 is an exploded view of the preferred embodiment of the present invention.
Figure 4:
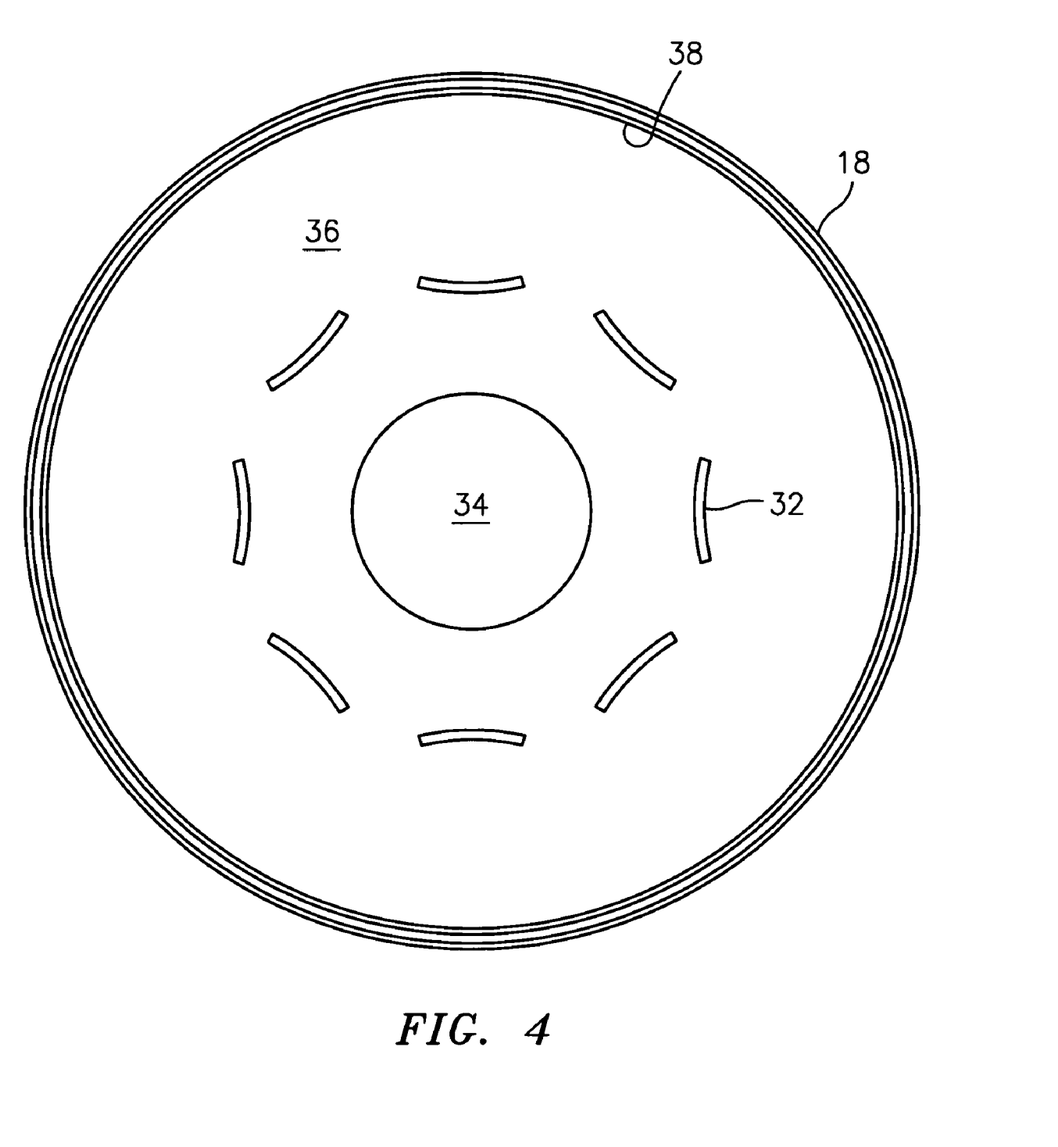
FIG. 4 is a bottom view of a component of the preferred embodiment of the present invention.
Figure 5:
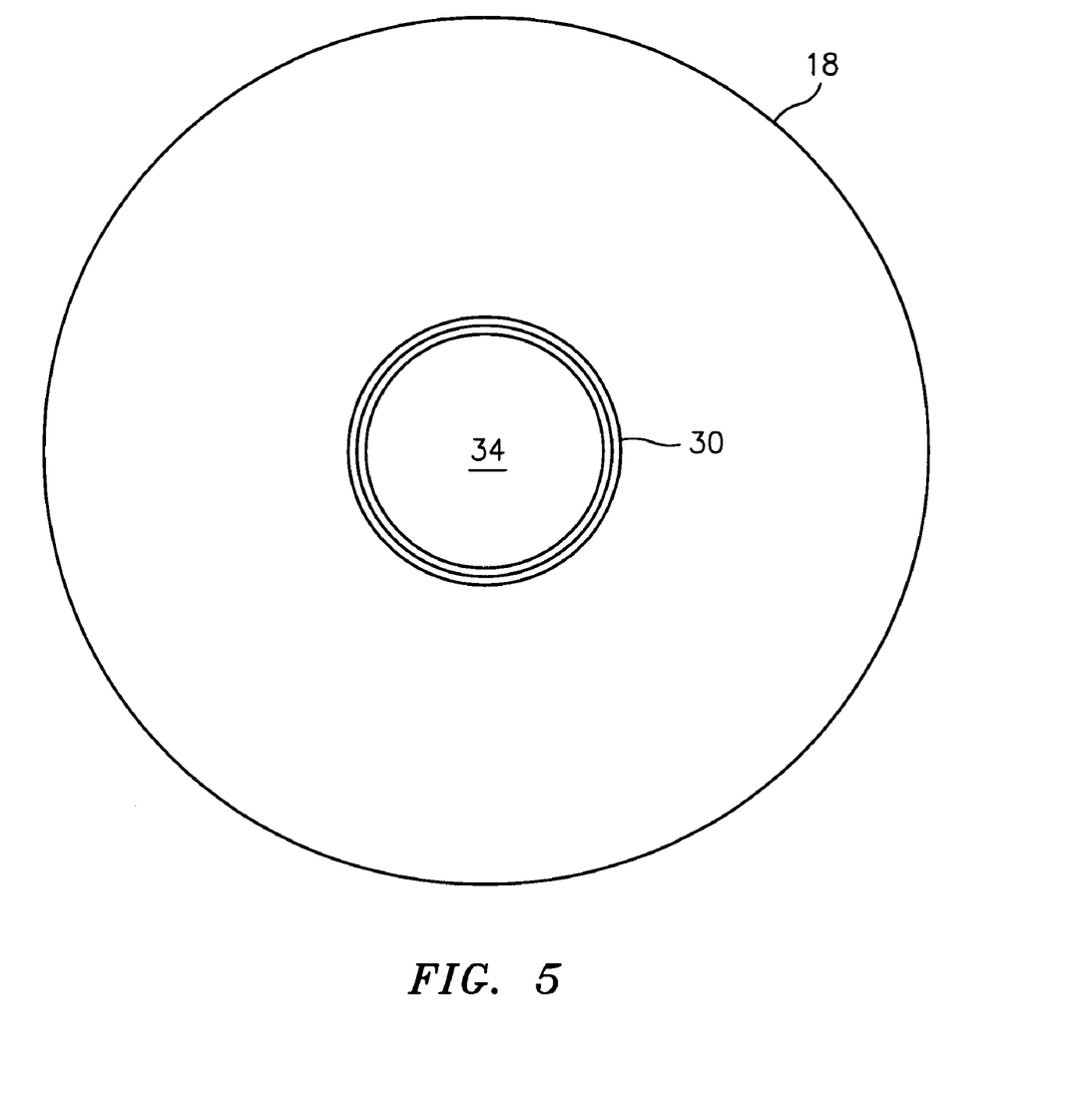
FIG. 5 is a top view of a component of the preferred embodiment of the present invention.
Figure 6:
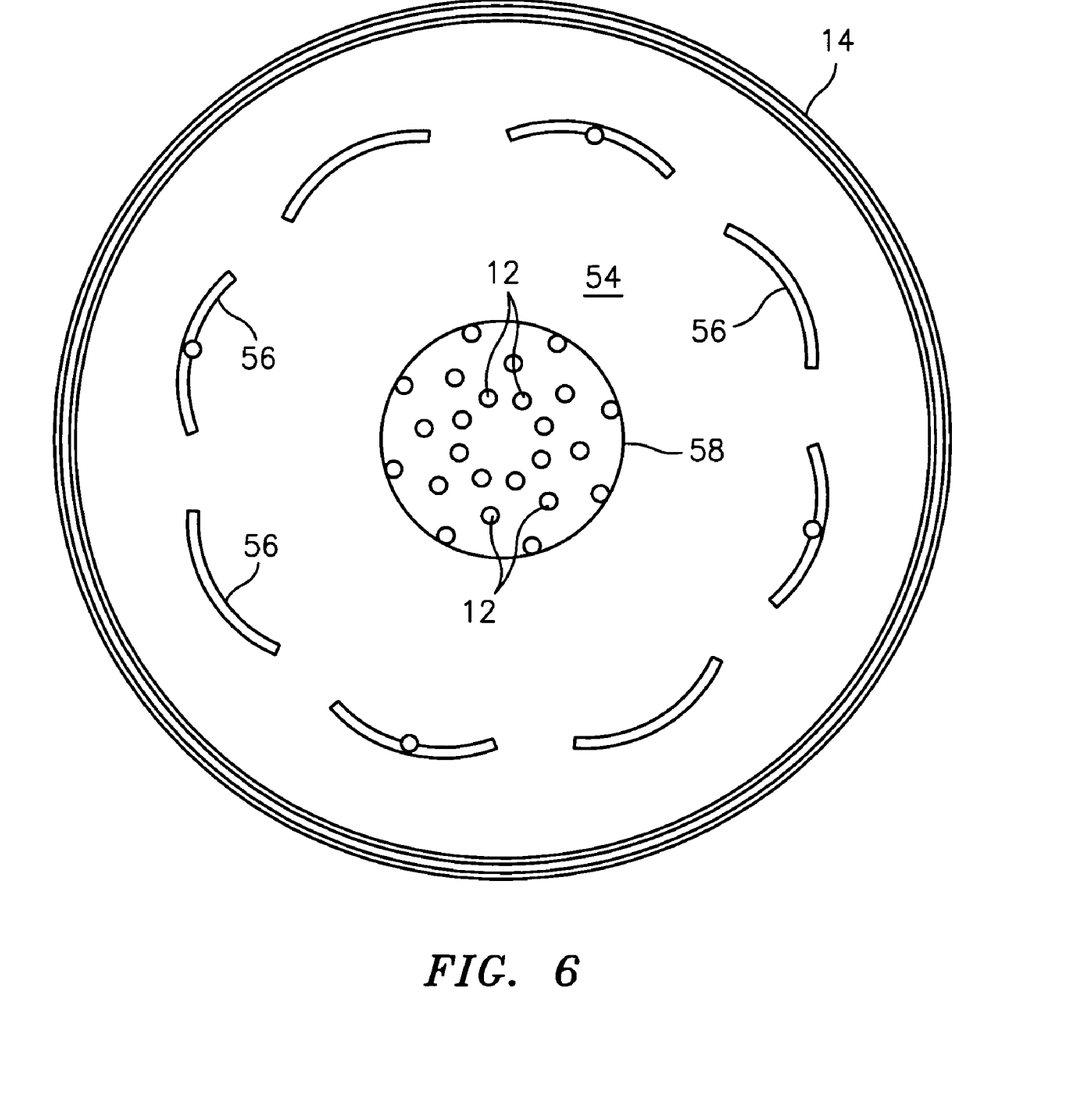
FIG. 6 is a bottom view of a component of the preferred embodiment of the present invention.
Figure 7:
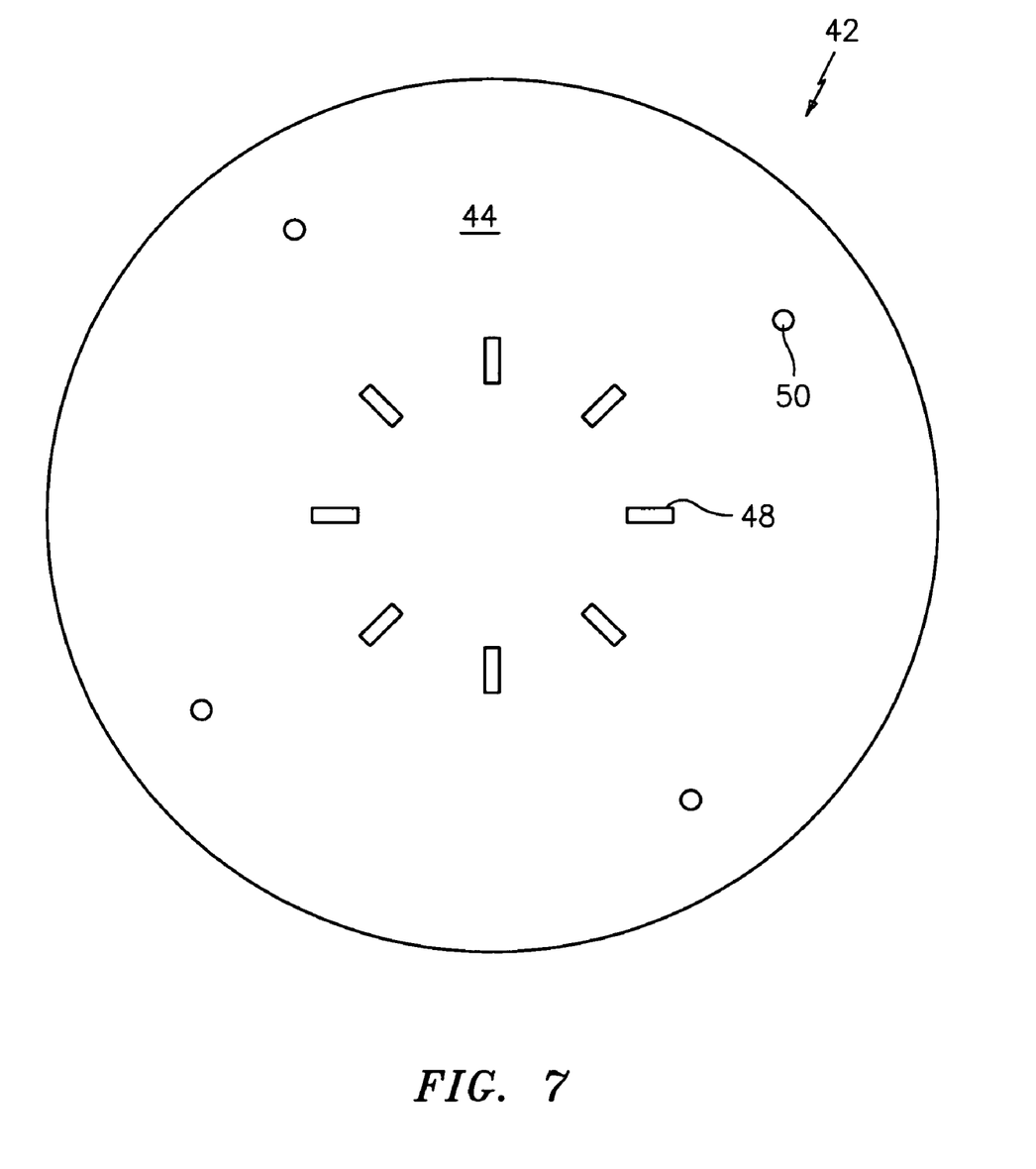
FIG. 7 is a top view of a component of the preferred embodiment of the present invention.
Figure 8:
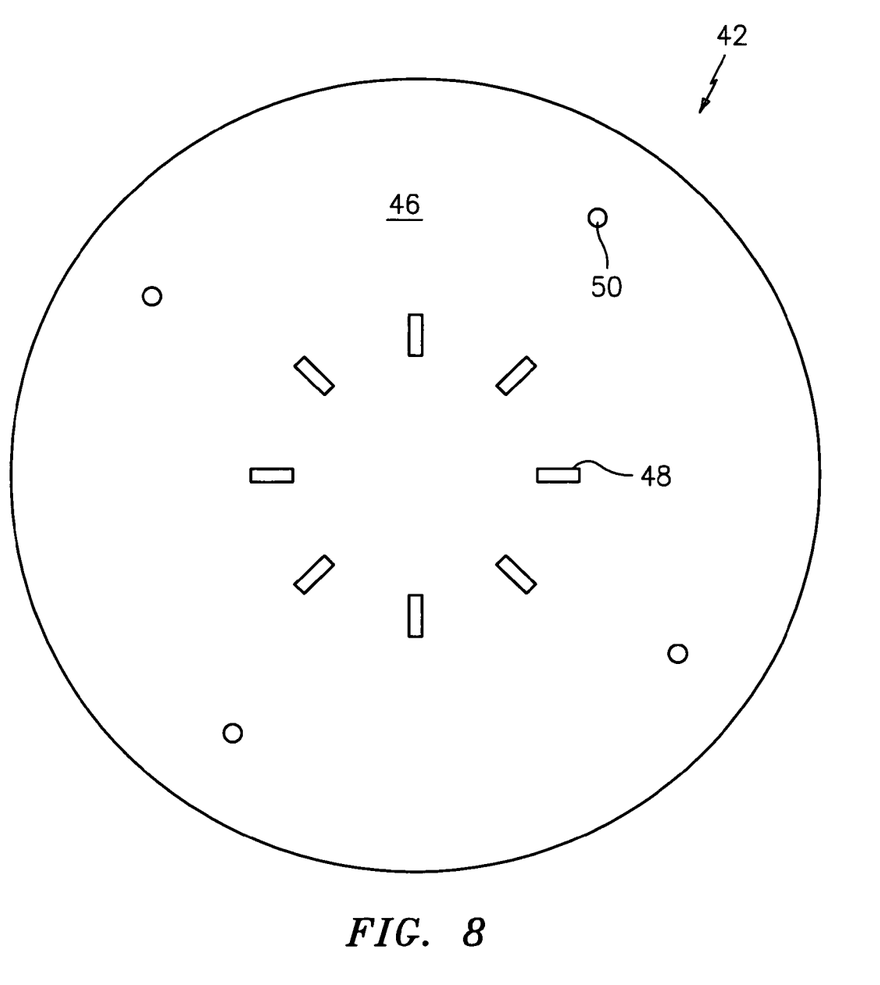
FIG. 8 is a bottom view of a component of the preferred embodiment of the present invention.
Figure 9:
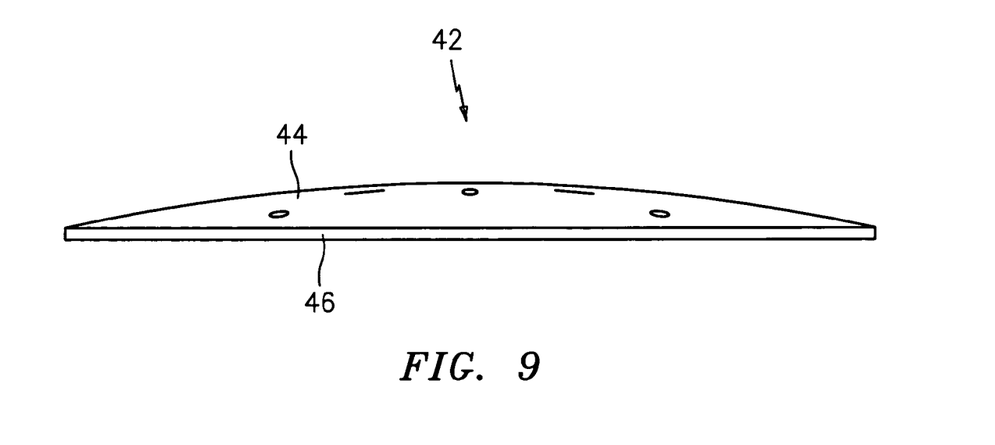
FIG. 9 is a side view of a component of the preferred embodiment of the present invention.

Referring to FIG. 1—, a filter cartridge (10) comprises a plurality of inlet holes (12) located on the top side of an upper housing (14), and a plurality of outlet holes (16) located on the bottom side of a lower housing (18). The upper housing (14) of the preferred embodiment has a raised central portion (20) rising from the upper surface (22), and the inlet holes (12) reside on both surfaces. It is conceivable that the upper surface (22) can be flush with no raised portion (20), or it may have a differently configured raised portion (20). The outlet holes (16) are located on an outlet plate (24) that holds a filter screen (26), preferably made of non-woven polyester. While in the preferred embodiment the plate (24) is sonic welded in place, it is possible to make it removable for cleaning or replacement of the filter screen (26). It is conceivable that the outlet holes (16) could simply exist directly on the bottom surface (28) without the need for a removable plate (24). Furthermore, while an extending portion (30) is provided to locate the outlet holes (16) selectively to cooperate with additional, surrounding structure (not shown) dependent upon the appliance that the cartridge (10) is to be used with, it is possible to eliminate the extending portion (30) or to re-configure it.

The lower housing (18) is provided with a plurality of lower diverter plates (32) attached to the floor of an internal space in the lower housing. The lower diverter plates (32) concentrically surround a central opening (34) of the lower housing (18) that corresponds with the extending portion (30) and the outlet holes (16). The internal space (36) formed inside of the lower housing (18) is defined by the space enclosed by the interior circumferential wall (38) of the lower housing (18).

Figure 10:
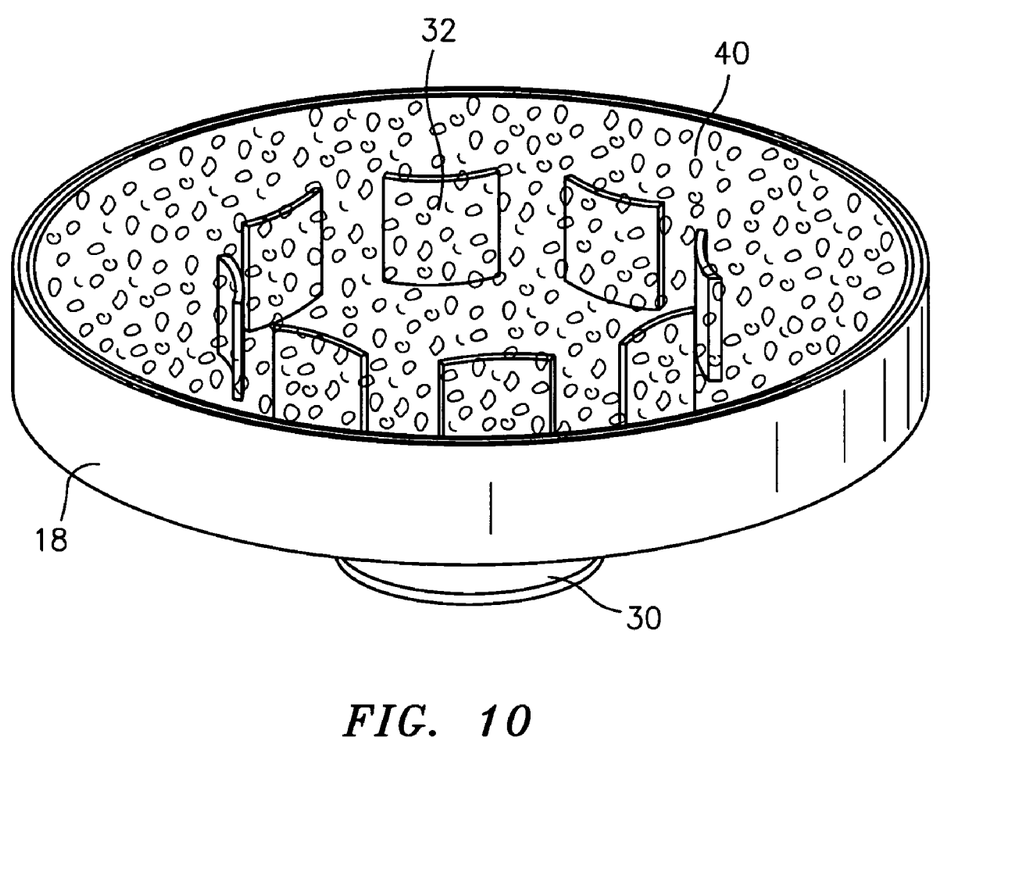
FIG. 10 is a top, perspective view of a component of the preferred embodiment of the present invention.
Figure 11:
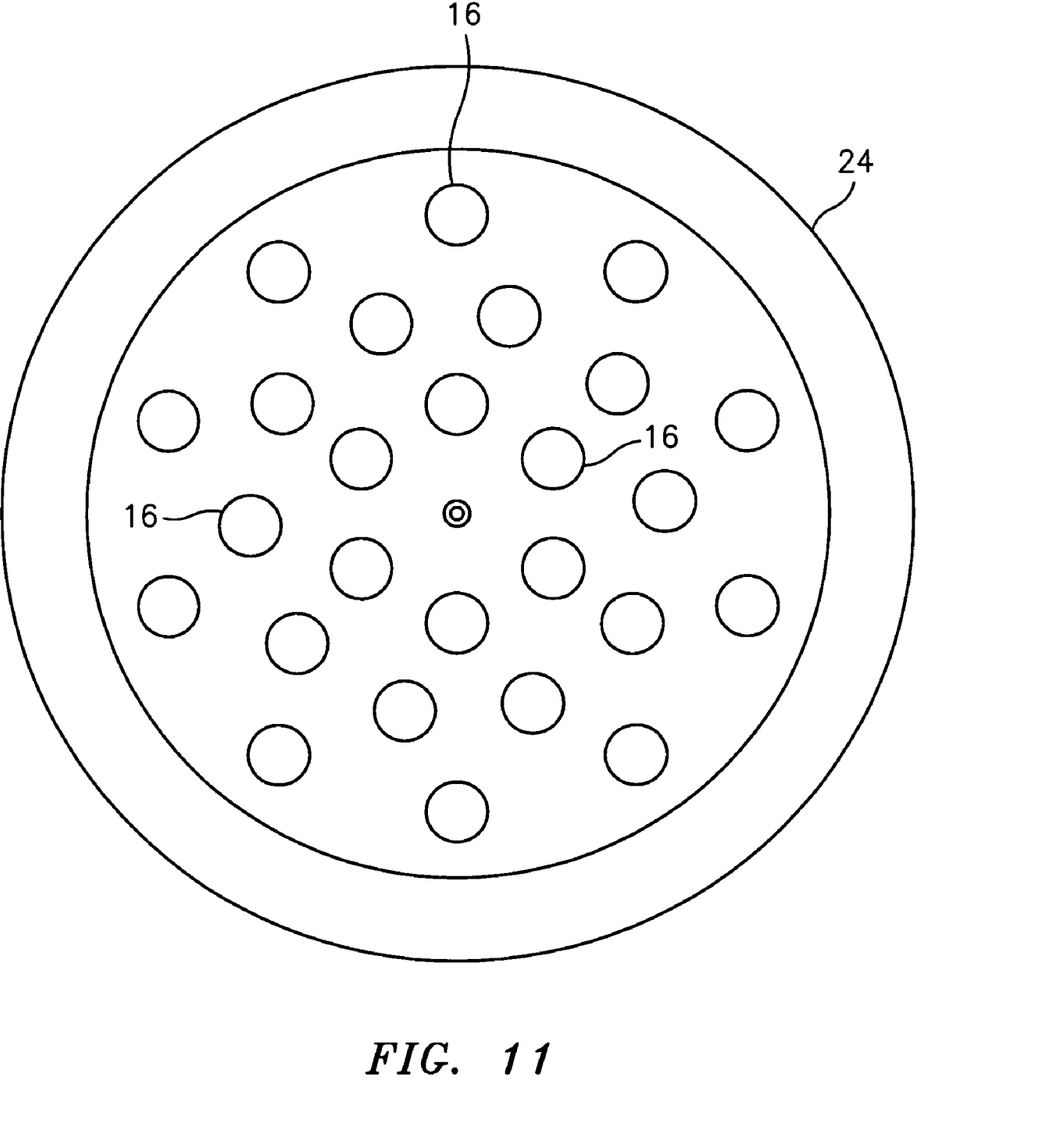
FIG. 11 is a top view of a component of the preferred embodiment of the present invention.
Figure 12:
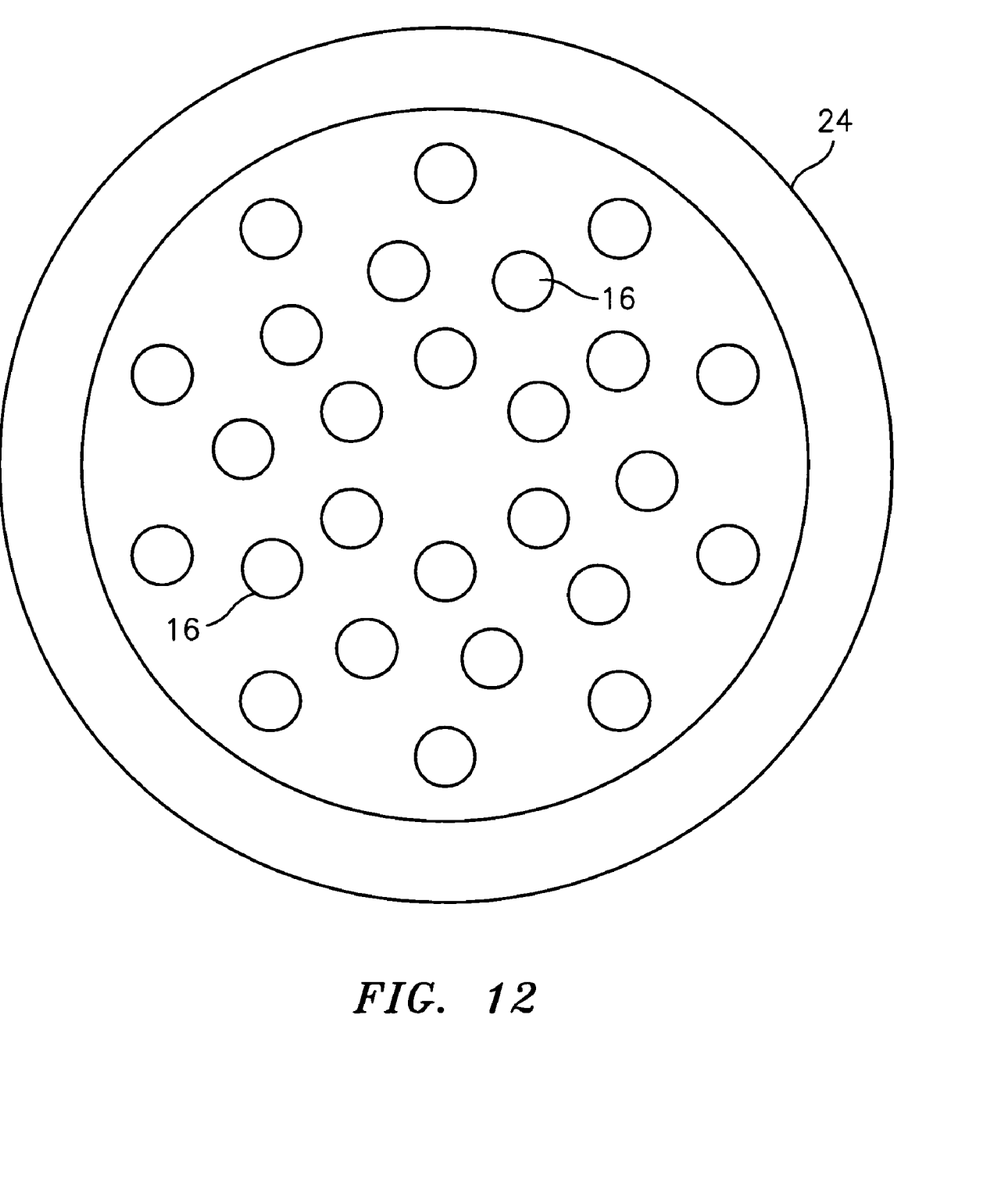
FIG. 12 is a bottom view of a component of the preferred embodiment of the present invention.
Figure 13:
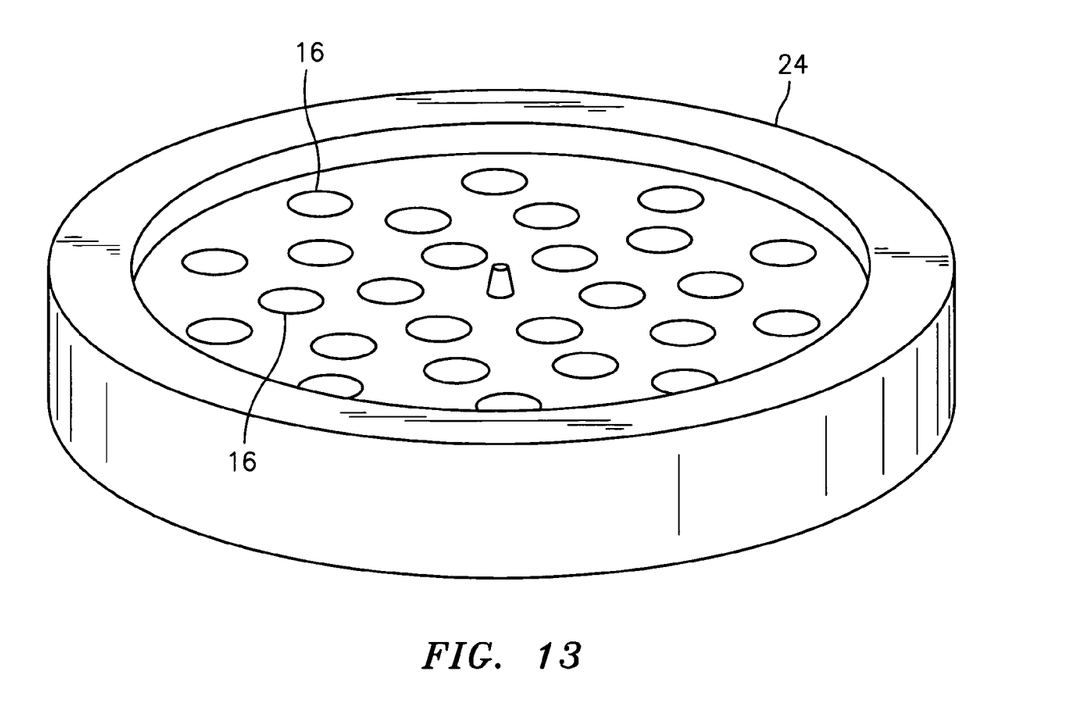
FIG. 13 is a perspective view of a component of the preferred embodiment of the present invention.
Figure 14:
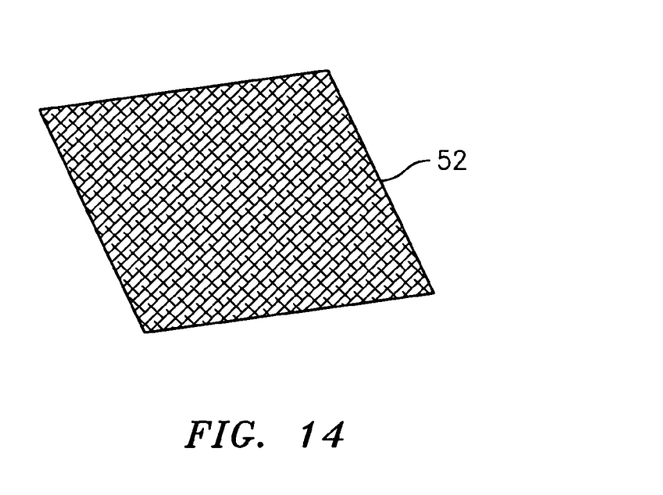
FIG. 14 is a perspective view of a component of the preferred embodiment of the present invention.
Figure 15:
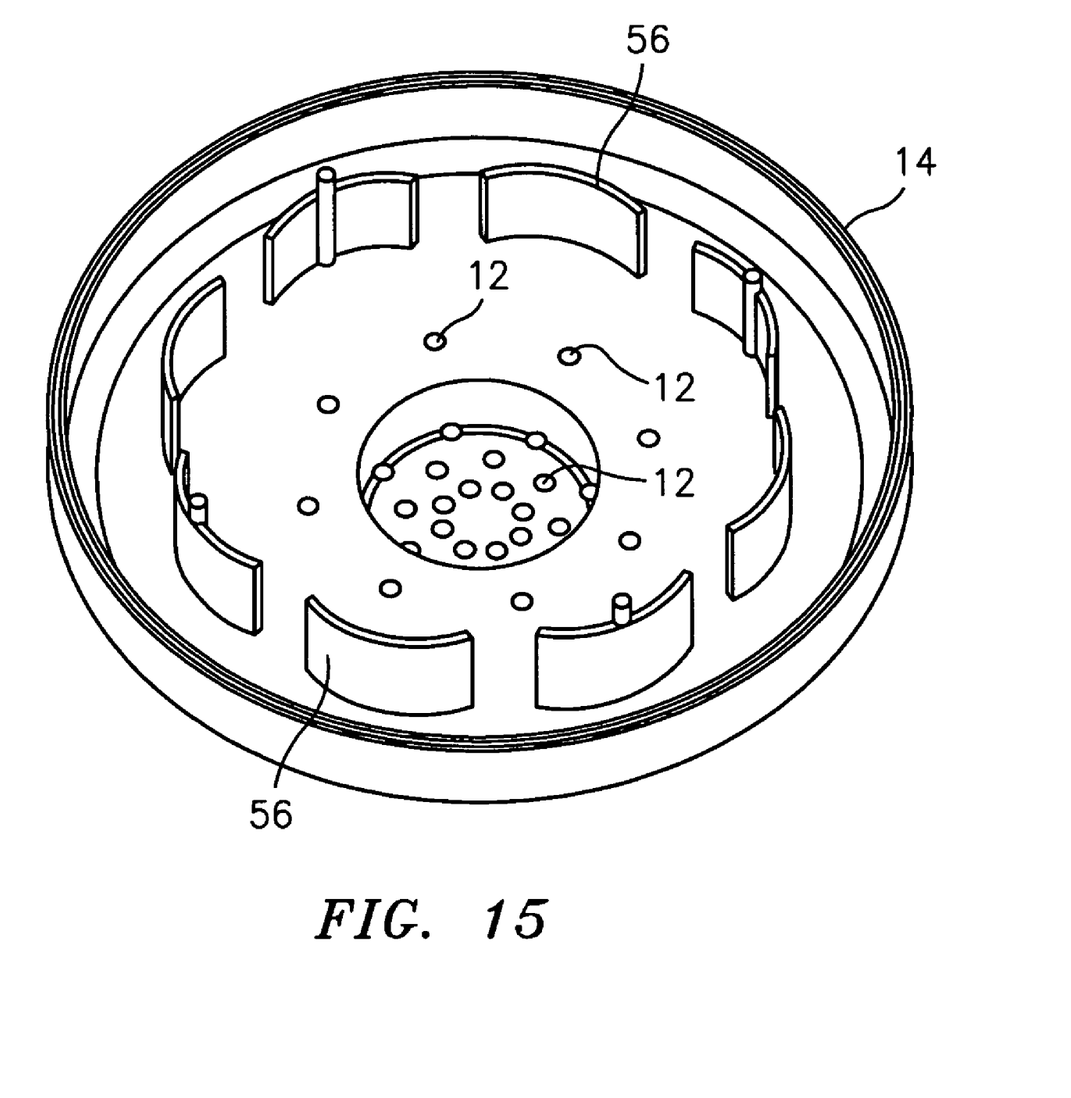
FIG. 15 is a perspective, bottom view of a component of the preferred embodiment of the present invention.
Figure 16:
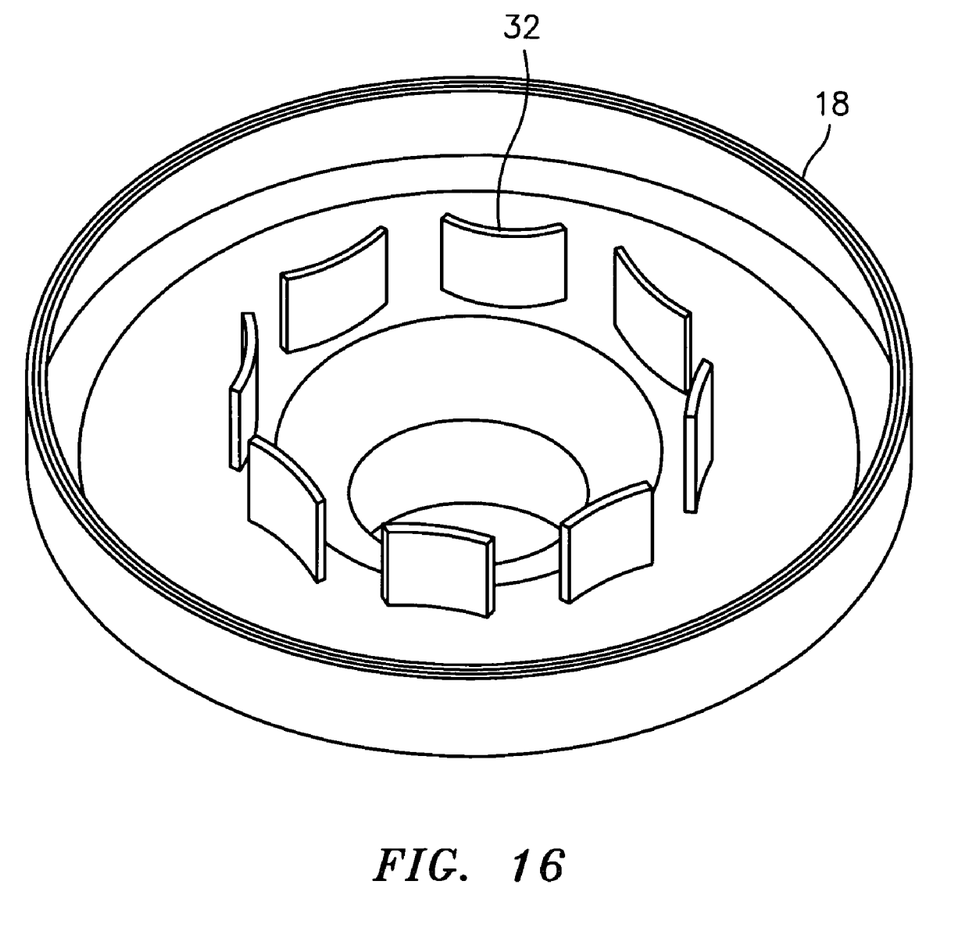
FIG. 16 is a perspective, bottom view of a component of the preferred embodiment of the present invention.

A charcoal medium (40), shown schematically in FIG. 10, of a type generally known is positioned inside of the lower housing (18). A diffuser plate (42) is positioned over the charcoal medium (14). The diffuser plate (42) is generally saucer-shaped having a convex upper surface (44) and a concave lower surface (46). The diffuser plate (42) has a plurality of slots (48) and holes (50) arranged generally concentrically around the center of the diverter plate (42). An upstream filter screen (52), preferably made of non-woven polyester, is provided above the diffuser plate (42). Finally, the upper housing (14) is closed over the top of the above-mentioned components to seal them within an internal space formed by the upper housing (14) and the lower housing (18) when they are attached to each other. Optionally, additional charcoal medium may also be positioned above the diffuser (42) or above the upstream filter screen (52) so that it is contained within an inner space formed by the upper housing (14).

The inner surface (54) of the upper housing (14) is provided with a plurality of upper diverter plates (56) positioned generally concentrically around a central opening (58) that coincides with the inlet holes (12).

During use, the filter cartridge (10) is positioned inside of an appliance (not shown) through which a liquid is passed. Liquid under pressure enters the inlet holes (12) and proceeds through the upstream filter screen (52). The liquid then contacts the diffuser (42) and is dispersed along the top of the diffuser so that some of the liquid passes through the slots (48), some passes through the holes (50), and some passes around the circumferential edge of the diffuser (42), which has a diameter that is less than the internal diameter formed by the internal circumferential wall of the lower housing (18). As the liquid flows past the diffuser (42), it makes its way to the central opening (34) of the lower housing (18) and exits out the outlet holes (16). While the liquid flows within the internal space formed by the housings (14, 18), the upper and lower diverter plates (56, 32) diver the liquid so that it is evenly distributed among the residing charcoal medium. Additionally, the diverter plates (56, 32) serve to physically stabilize the charcoal medium.

While the preferred embodiments of the present invention have been herein described, various modifications may be made without departing from the scope of the present invention.

What is claimed is:

1. A filter cartridge assembly for filtering liquid, said assembly comprising
    a housing being generally disc-shaped and having a hollow interior, said housing having an upper exterior surface, a lower exterior surface, an upper interior surface, a lower interior surface, and a circumferential wall;
    an upper housing extension portion extending up from said upper exterior surface of said upper housing portion and having a width that is less than the diameter of said housing;
    a first set of inlet holes on said upper exterior surface of said upper housing portion and communicating with said hollow interior of said housing;
    a second set of inlet holes on said upper surface of said upper housing extension portion and communicating with said hollow interior of said housing;
    a filter screen positioned beneath and adjacent to said upper exterior surface and contained with said hollow interior;
    a diffuser plate having a generally round shape and a generally convex upper surface and a generally concave lower surface and having a plurality of radially outward extending openings arranged about the center of the plate and extending therethrough, said diffuser plate being positioned beneath and adjacent to said filter screen;
    a plurality of diverter plates extending up from said lower interior surface, each diverter plate having a constant height and an upper edge that is generally parallel to said lower interior surface;
    a layer of charcoal filter medium dispersed on said lower interior surface and filling space between and in contact with said circumferential wall and said diverter plates, said layer being contained beneath said diffuser plate;
    an outlet spout extending downwardly from said lower exterior surface and communicating with said hollow interior; and
    a removable outlet cap adapted to be selectively inserted or removed from said outlet spout, said outlet cap having a plurality of outlet holes.

\* \* \* \* \*